(12) United States Patent
Song et al.

(10) Patent No.: US 9,146,344 B1
(45) Date of Patent: Sep. 29, 2015

(54) BACKLIGHT MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yong Song, Beijing (CN); Rui Li, Beijing (CN); Gang Yang, Beijing (CN); Jun Long, Beijing (CN); Hongkun Zhang, Beijing (CN); Xijun An, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/498,335

(22) Filed: Sep. 26, 2014

(30) Foreign Application Priority Data

Apr. 23, 2014 (CN) .......................... 2014 1 0165727

(51) Int. Cl.
*H05K 5/02* (2006.01)
*F21V 8/00* (2006.01)

(52) U.S. Cl.
CPC ............ *G02B 6/0085* (2013.01); *G02B 6/0023* (2013.01)

(58) Field of Classification Search
CPC ..................................................... H05K 5/0217
See application file for complete search history.

(56) References Cited

U.S. PATENT DOCUMENTS

| | | | |
|---|---|---|---|
| 2011/0193897 A1* | 8/2011 | Park et al. ...................... | 345/691 |
| 2012/0127749 A1* | 5/2012 | Kuo et al. ...................... | 362/600 |
| 2014/0029295 A1* | 1/2014 | Hsiao et al. .................... | 362/606 |
| 2015/0153029 A1* | 6/2015 | Zeng .............................. | 362/633 |

* cited by examiner

*Primary Examiner* — Lex Malsawma
(74) *Attorney, Agent, or Firm* — Nath, Goldberg & Meyer; Joshua B. Goldberg

(57) ABSTRACT

The present invention provides a backlight module and a display device. The backlight module comprises a light source and a backplate comprising a baseplate and a side plate surrounding edges of the baseplate, wherein the light source is provided on the side plate, the baseplate is formed by jointing a plurality of sub-baseplates with different heat conductivities together, and the plurality of sub-baseplates can allow heat generated by the light source to be circulated and led out. In the backlight module provided by the present invention, by jointing a plurality of sub-baseplates with different heat conductivities together to form the baseplate, heat generated by the light source can be circulated and conducted along the sub-baseplates with different heat conductivities, which greatly accelerates heat conduction in the baseplate, may cause the overall temperature of the baseplate to be lowered rapidly and be more uniform, and avoids appearance of wrinkles in film layer with smaller thickness in the backlight module. With the above backlight module, the display device becomes lighter and thinner, and can also ensure good display luminance and display quality.

11 Claims, 3 Drawing Sheets

BACKLIGHT MODULE AND DISPLAY DEVICE

FIELD OF THE INVENTION

The present invention relates to the field of display technology, and particularly relates to a backlight module and a display device.

BACKGROUND OF THE INVENTION

With the improvement of living standards, demands on display products change rapidly. Future display devices will develop to be lighter and thinner, and with higher luminance, lower power consumption and higher quality.

At present, to make a display product lighter and thinner, the main solution is to continuously reduce the thickness of a backlight module. The thickness of the backlight module is reduced mainly by reducing the thicknesses of respective film materials in the backlight module, such as a backplate, a diffuser plate and an optical film layer in the backlight module, by reducing the thickness of a system housing for packaging the backlight module, and the like. In addition, to reduce the thickness of the backlight module, the backlight module generally adopts an edge-type light source, that is, light emitted from the light source enters from one side of the backplate, and most of incident light enters into the diffuser plate from one side thereof. The diffuser plate can diffuse incident light, so that light passing through the diffuser plate becomes more uniform.

To reduce the thickness of the system housing, unnecessary metal or nonmetal material of some parts in the system housing can be generally removed, so that the thickness of the system housing becomes non-uniform, and this may directly result in non-uniform heat conduction of the backlight module packaged inside the housing, that is, local temperature inside the backlight module is high, and in addition, thicknesses of respective film layers in the backlight module become thinner and thinner, which readily cause a film layer with a smaller thickness in the backlight module to wrinkle, thus seriously affecting the display quality of the display product.

Further, as the thickness of the diffuser plate in the backlight module is reduced, the specification and dimension of the light source is accordingly reduced, and this causes both light extraction amount of the light source and transmission efficiency of the diffuser plate to be reduced, so that the backlight brightness of the backlight module is limited, resulting in that the luminance of an ultrathin display product is generally low.

SUMMARY OF THE INVENTION

In view of the above technical problems existing in the prior art, the present invention provides a backlight module and a display device. In the backlight module, by jointing a plurality of sub-baseplates with different heat conductivities together to form a baseplate, heat generated by radiation of the light source can be circulated and led out along the sub-baseplates with different heat conductivities, which greatly accelerates heat conduction in the baseplate, may cause the overall temperature of the baseplate to be lowered rapidly and be more uniform, and avoids the appearance of wrinkles in a film layer with smaller thickness in the backlight module.

The present invention provides a backlight module, comprising a light source and a backplate which comprises a baseplate and a side plate surrounding edges of the baseplate, wherein the light source is provided on the side plate, the baseplate is formed by jointing a plurality of sub-baseplates with different heat conductivities together, and the plurality of sub-baseplates can allow heat generated by radiation of the light source to be circulated and led out.

Preferably, the plurality of sub-baseplates are made of different materials, and are sequentially jointed together in descending or ascending order of heat conductivity of material.

Preferably, each of the plurality of sub-baseplates is a small wedge, and the baseplate is a large wedge formed by the plurality of sub-baseplates; the thicknesses of the plurality of sub-baseplates are increased linearly, and the sub-baseplate with the highest heat conductivity has the smallest overall thickness.

Preferably, the small wedge includes a straight wedge or a curved wedge, accordingly, a contacting surface through which two adjoining sub-baseplates are jointed together includes one plane or two planes with an included angle θ, θ is the smaller one of included angles formed between the two planes, wherein 0°<θ<180°, and an opening of the included angle θ faces the sub-baseplate with lower heat conductivity.

Preferably, in descending order of heat conductivity, cross sectional areas of the plurality of sub-baseplates perpendicular to a thickness direction of the sub-baseplates are sequentially increased.

Preferably, the plurality of sub-baseplates are jointed together by welding.

Preferably, the backlight module further comprises a housing encasing the backplate, a first opening is provided at a side of the housing corresponding to the sub-baseplate with the lowest heat conductivity, and a second opening is provided at a side of the housing corresponding to the sub-baseplate with the highest heat conductivity.

Preferably, the light source is provided on the side plate at the side of the sub-baseplate with the highest heat conductivity, and light-emitting surface of the light source faces the baseplate.

Preferably, the backlight module further comprises a diffuser plate provided above the baseplate, the diffuser plate has the same shape as the baseplate, and an upper surface of the diffuser plate is parallel to a lower surface of the baseplate.

The present invention further provides a display device comprising the above backlight module.

Beneficial effects achieved by the present invention are as follows. In the backlight module provided by the present invention, by jointing a plurality of sub-baseplates with different heat conductivities together to form the baseplate, heat generated by radiation of the light source in the backlight module can be circulated and conducted along the sub-baseplates with different heat conductivities, which greatly accelerates heat conduction in the baseplate, may cause the overall temperature of the baseplate to be lowered rapidly and be more uniform, and avoids appearance of wrinkles in a film layer with smaller thickness in the backlight module.

With the above backlight module, the display device provided by the present invention can be made lighter and thinner, and can also ensure good display luminance and display quality at the same time.

Figure 1:
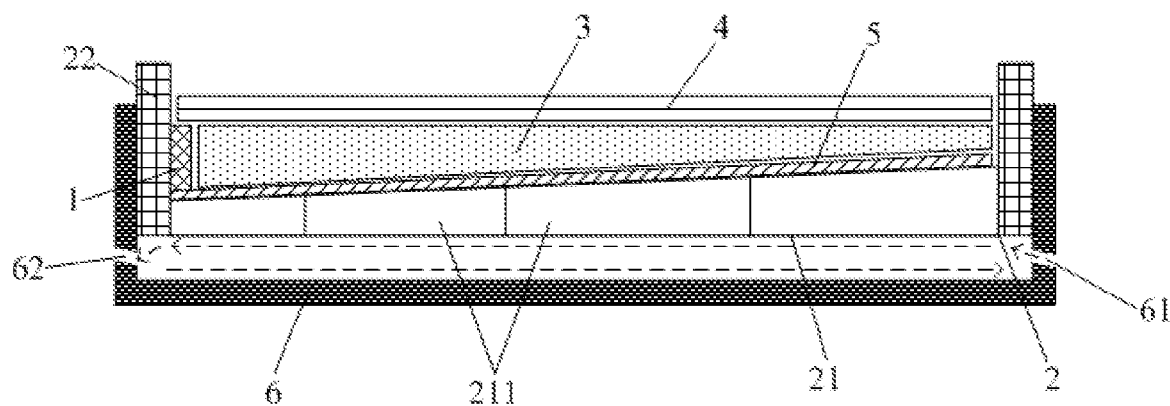
FIG. 1 is a sectional view of a backlight module in Embodiment 1 of the present invention.

REFERENCE NUMERALS 1. light source; 2. backplate; 21. baseplate; 211. sub-baseplate; 211a. sub-baseplate A; 211b. sub-baseplate B; 211c. sub-baseplate C; 211d. sub-baseplate D; 211e. sub-baseplate E; 22. side plate; P. contacting surface, 3. diffuser plate; 4. optical film; 5. reflection sheet; 6. housing; 61. first opening; 62. second opening.

DETAILED DESCRIPTION OF THE EMBODIMENTS

For better understanding of the technical solutions of the present invention by those skilled in the art, a backlight module and a display device provided by the present invention are further described in detail below in conjunction with the accompanying drawings and specific implementations.

Embodiment 1

The present invention provides a backlight module, which, as shown in FIG. 1, comprises a light source 1 and a backplate 2 including a baseplate 21 and a side plate 22 surrounding edges of the backplate 2, the light source 1 is provided on the side plate 22, the baseplate 21 is formed by jointing a plurality of sub-baseplates 211 with different heat conductivities together, and the plurality of sub-baseplates 211 can enable heat generated by radiation of the light source to be circulated and led out, thus resulting in lowered and more uniform overall temperature of the baseplate 21.

Here, the plurality of sub-baseplates 211 are made of different materials, and are sequentially jointed together in descending or ascending order of heat conductivity of material. Jointing the sub-baseplates 211 sequentially in the order of heat conductivity can cause heat in the baseplate 21 to be transferred quickly from one end with lower heat conductivity to another end with higher heat conductivity, so that heat conduction in the baseplate 21 forms a circulation, which facilitates quick leading-out of heat in the baseplate 21 to external environment, and further lowers the overall temperature of the baseplate 21.

In this embodiment, each sub-baseplate is a small wedge, and the baseplate 21 is a large wedge formed by the sub-baseplates 211. Here, a wedge indicates that one of the two opposite ends of the baseplate 21 (or sub-baseplate 211) is thinner and the other is thicker, and thickness of the baseplate 21 (or sub-baseplate 211) is decreased linearly from the thicker end to the thinner end. Thicknesses of the plurality of sub-baseplates 211 are increased linearly, and the sub-baseplate 211 with the highest heat conductivity has the smallest overall thickness. As the thickness of each small wedge is increased linearly from one end to the other end, and the jointing ends of any two adjoining small wedges have the same thickness, a big wedge can be formed by sequentially jointing a plurality of small wedges (i.e. the plurality of sub-baseplates). The baseplate formed through such jointing guarantees both surface flatness and enough mechanical strength.

In this embodiment, heat conductivities of the sub-baseplates 211 are sequentially decreased as the overall thicknesses of the sub-baseplates 211 are sequentially increased, that is, the sub-baseplate 211 with relatively low heat conductivity has a relatively bigger overall thickness, which is equivalent to that the contacting area between the sub-baseplate 211 with relatively low heat conductivity and the sub-baseplate 211 with relatively high heat conductivity is increased, and therefore, heat conduction from the sub-baseplate 211 with relatively low heat conductivity to the sub-baseplate 211 with relatively high heat conductivity is accelerated, thus enabling heat to be rapidly led out to the external environment, which further results in lowered and more uniform overall temperature of the baseplate 21.

Figure 2:
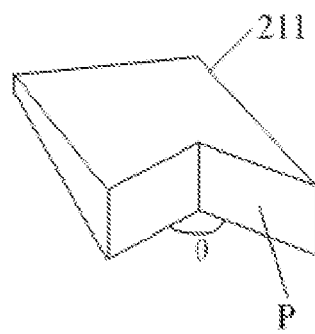
FIG. 2 is a schematic diagram of a structure of a sub-baseplate in FIG. 1.
Figure 3:
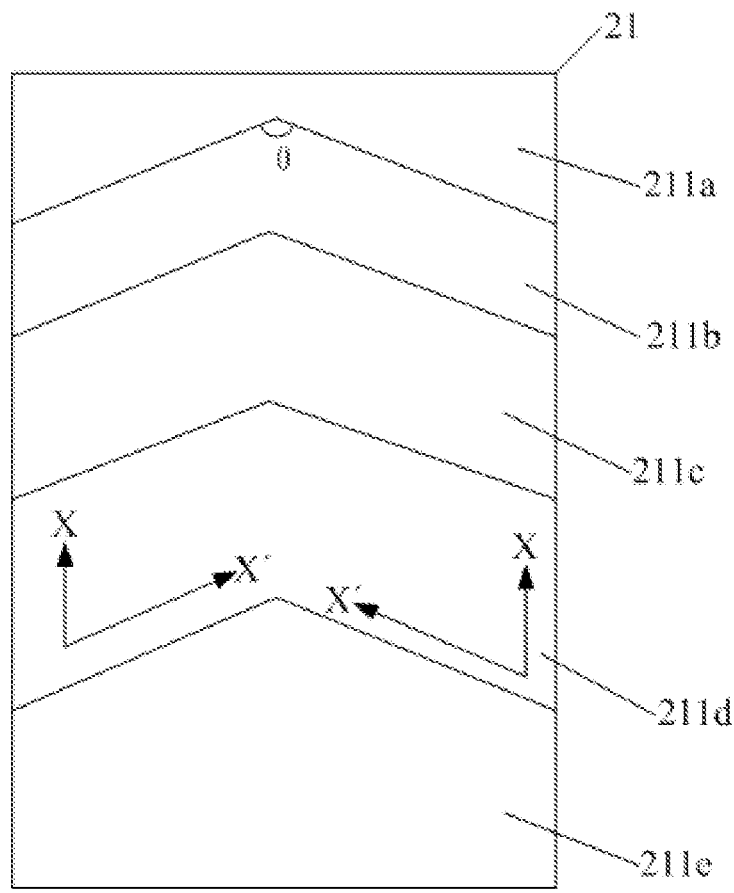
FIG. 3 is a top view of a baseplate in FIG. 1.

In this embodiment, as illustrated in FIG. 2, the small wedge is a curved wedge, in which, a contacting surface P through which the small wedge is jointed with its adjoining small wedge includes two planes with included angle θ, θ is the smaller one of the included angles formed between the two planes, wherein 0°<θ<180°, and an opening of the included angle θ faces the sub-baseplate 211 with lower heat conductivity. For example, as illustrated in FIG. 3, the baseplate 21 is formed by jointing five sub-baseplates together, which are sub-baseplate A 211a, sub-baseplate B 211b, sub-baseplate C 211c, sub-baseplate D 211d and sub-baseplate E 211e, and these five sub-baseplates 211 are sequentially jointed together in descending order of heat conductivity, that is, the sub-baseplate A 211a has the highest heat conductivity and the sub-baseplate E 211e has the lowest heat conductivity. Here, the curved wedge indicates that the contacting surface through which two adjoining sub-baseplates are jointed is an end surface in arrow shape formed by two planes with included angle θ, the two planes with included angle θ correspond to two wings of the arrow, and the tip of the arrow at which the two wings are connected points to the sub-baseplate with higher heat conductivity. With such configuration, in the process of conducting heat from the sub-baseplate E 211e to the sub-baseplate A 211a, heat, on one hand, is conducted in X direction from the sub-baseplate E 211e to the sub-baseplate A 211a, and on the other hand, is conducted in X' direction from the two wings of the arrow to the tip of the arrow, that is, heat is conducted from the sub-baseplate E 211e to the sub-baseplate A 211a in two directions, which can accelerate heat conduction, enable heat to be led out into external environment as soon as possible, and further make the overall temperature of the baseplate 21 lower and more uniform.

In this embodiment, as illustrated in FIG. 3, in descending order of heat conductivity, cross sectional areas of the plurality of sub-baseplates perpendicular to the thickness direction are sequentially increased. That is, the sub-baseplate (for example, the sub-baseplate A 211a) with relatively high heat conductivity has a relatively small surface area, and the sub-baseplate (for example, the sub-baseplate E 211e) with relatively low heat conductivity has a relatively large surface area. The larger the surface area is, the quicker the heat dissipation rate is, and therefore, the sub-baseplate with relatively low heat conductivity can achieve a rapid heat dissipation effect through a relatively large surface area, which causes heat to be led out rapidly into external environment, and further makes the overall temperature of the baseplate 21 lower and more uniform.

In this embodiment, as illustrated in FIG. 1, the plurality of sub-baseplates 211 are jointed together by welding, such that heat conduction rate between sub-baseplates 211 with different heat conductivities is not affected, which causes heat to be conducted rapidly into external environment.

Furthermore, the backlight module further comprises a housing 6 encasing the outside of the backplate 2, a first opening 61 is provided at one side of the housing 6 corresponding to the sub-baseplate 211 with the lowest heat conductivity, and a second opening 62 is provided at the other side of the housing 6 corresponding to the sub-baseplate 211 with the highest heat conductivity. Since heat is always transferred from a sub-baseplate 211 with lower heat conductivity to a sub-baseplate 211 with higher heat conductivity, different sub-baseplates 211 may have different temperatures during the process of heat conduction. Cold air enters into the housing through the first and second openings 61 and 62, and under the influence of the temperature difference among the sub-baseplates 211, air flows from one end with low temperature to the other end with high temperature, thus air outside and inside the housing 6 forms a circulation, which further accelerate heat conduction and eventually can make the overall temperature of the baseplate 21 lower and more uniform.

The light source 1 is provided on the side plate 22 at the side of the sub-baseplate 211 with the highest heat conductivity, and light-emitting surface of the light source 1 faces the baseplate 21. As heat generated by radiation of the light source is mainly concentrated near the light source 1, providing the light source 1 at the side of the sub-baseplate 211 with the highest heat conductivity facilitates conducting heat generated by the light source 1 into external environment rapidly, thus preventing heat from being concentrated in local region, which can further make the overall temperature of the baseplate 21 lower and more uniform.

In this embodiment, the backlight module further comprises a diffuser plate 3, which can diffuse light emitted from the light source 1 to make light more uniform, provided above the baseplate 21. The diffuser plate 3 has substantially the same shape as the baseplate 21, and an upper surface of the diffuser plate 3 is parallel to a lower surface of the baseplate 21. That is, the diffuser plate 3 is wedge-shaped, the end of the diffuser plate 3 with smaller thickness corresponds to the end of the baseplate 21 with bigger thickness, the end of the diffuser plate 3 with bigger thickness corresponds to the end of the baseplate 21 with smaller thickness, and this eventually makes the upper surface of the diffuser plate 3 parallel to the lower surface of the baseplate 21, thus ensuring flatness and stability of the whole backlight module and facilitating uniform light emitting from the diffuser plate 2 as well as adequate and effective use of light. In addition, the light source 1 is provided on the side plate 22 at the side of the sub-baseplate 211 with the highest heat conductivity, the sub-baseplate 211 corresponding to the position of the light source 1 has the smallest thickness, while the part of the diffuser plate 3 corresponding to this position of the light source 1 has the largest thickness, and therefore, the light source 1 may adopt relatively large specification and dimension. Further, most of light emitted from the light source 1 can enter into the diffuser plate 3 through the end surface of the diffuser plate 3 with bigger thickness, so that light extraction amount of the light source 1 is greatly improved and conduction and diffusion efficiency of the diffuser plate 3 is also improved, and thus backlight brightness of the backlight module can be improved.

In this embodiment, the backlight module further comprises an optical film 4 which is provided above the diffuser plate 3 and is used for performing optical processing on light passing through the diffuser plate 3 and a reflection sheet 5 which is provided between the baseplate 21 and the diffuser plate 3 and is used for reflecting light irradiating on the baseplate 21 from the light source 1. Both the optical film 4 and the reflection sheet 5 are provided for effective use of light emitted from the light source 1. As the backlight module is getting thinner and thinner, and the optical film 4 and the reflection sheet 5 are also getting thinner and thinner, it can be ensured that no wrinkle appears in the optical film 4 or the reflection sheet 5 due to heat or non-uniform heat under the condition that the overall temperature of the improved baseplate 21 is lower and more uniform, thus ensuring quality of the backlight module.

Embodiment 2

Figure 4:
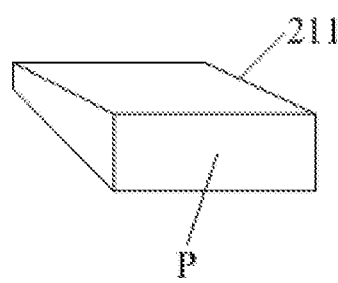
FIG. 4 is a schematic diagram of a structure of a sub-baseplate in Embodiment 2 of the present invention.

This embodiment provides a backlight module, which differentiates from that in Embodiment 1 in that the small wedge is a straight wedge, and the contacting surface P through which the two adjoining sub-baseplates 211 are jointed includes a plane, as illustrated in FIG. 4. Here, the straight wedge indicates that the contacting surface P of one small wedge through which this small wedge and its adjoining small wedge are jointed includes a plane.

Figure 5:
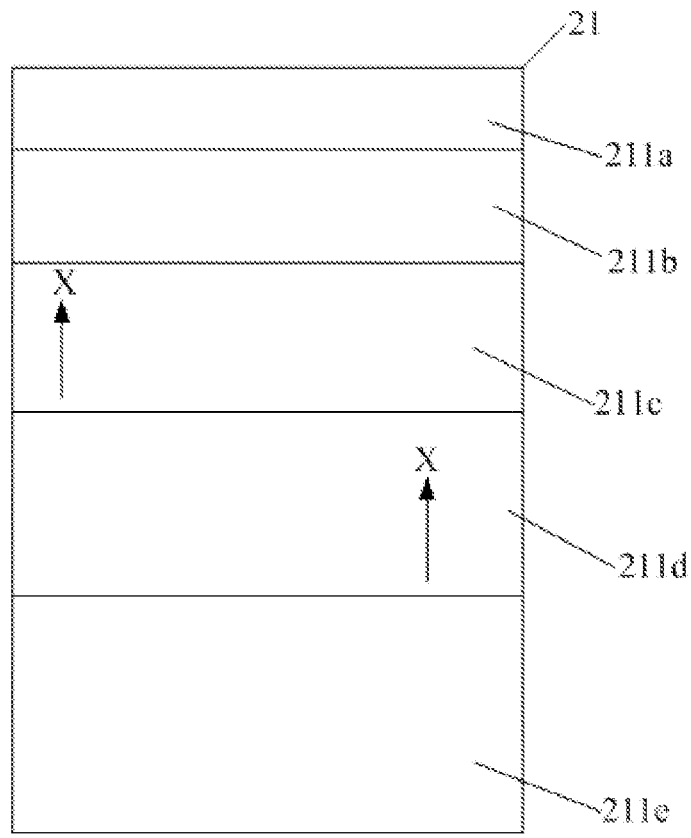
FIG. 5 is a top view of a baseplate in Embodiment 2 of the present invention.

As illustrated in FIG. 5, the straight wedge can cause heat to be conducted in X direction from the sub-baseplate E 211e to the sub-baseplate A 211a during the process of heat conduction. Compared with Embodiment 1, although heat can only be conducted in one direction, function of accelerating heat conduction can also be achieved, which causes heat to be led out into external environment as soon as possible, and further makes the overall temperature of the baseplate 21 lower and more uniform.

Other structures of the backlight module in this embodiment are the same as those in Embodiment 1, and thus are not elaborated here.

Embodiment 3

Figure 6:
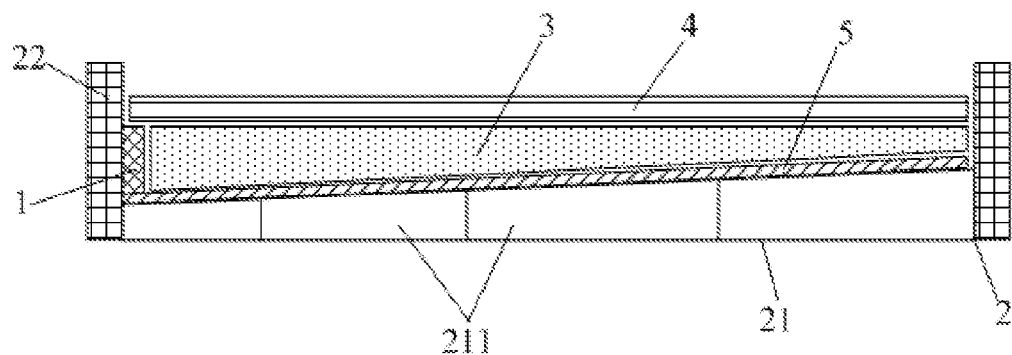
FIG. 6 is a sectional view of a backlight module in Embodiment 3 of the present invention.

This embodiment provides a backlight module, which differentiates from those in Embodiments 1 and 2 in that no housing is included in the backlight module, as illustrated in FIG. 6. That is, the backplate 2 is directly exposed to external environment, which is more favorable for direct leading-out of heat.

Other structures of the backlight module in this embodiment are the same as those in Embodiments 1 and 2, and thus are not elaborated here.

Beneficial effects achieved by Embodiments 1 to 3 are as follows. In the backlight modules provided by Embodiments 1 to 3, by jointing a plurality of sub-baseplates with different heat conductivities together to form the baseplate, heat generated by radiation of the light source in the backlight module can be circulated and conducted along the sub-baseplates with different heat conductivities, which greatly accelerates heat conduction in the baseplate, may cause the overall temperature of the baseplate to be lowered rapidly and be more uniform, and avoids appearance of wrinkles in a film layer with smaller thickness in the backlight module.

Embodiment 4

This embodiment provides a display device comprising the backlight module in any one of Embodiments 1 to 3.

With the backlight module in any one of Embodiments 1 to 3, the display device becomes lighter and thinner, and can also ensure good display luminance and display quality at the same time.

It can be understood that the above implementations are merely exemplary implementations used for explaining the principle of the present invention, but the present invention is not limited thereto. For those skilled in the art, various modifications and improvements may be made without departing from the spirit and essence of the present invention. These modifications and improvements are also considered to be the protection scope of the present invention.

The invention claimed is:

1. A backlight module, comprising a light source and a backplate which comprises a baseplate and a side plate surrounding edges of the baseplate, wherein the light source is provided on the side plate, and the baseplate is formed by jointing a plurality of sub-baseplates with different heat conductivities together, so that heat generated by radiation of the light source is circulated and led out.

2. The backlight module of claim 1, wherein the plurality of sub-baseplates are made of different materials, and are sequentially jointed together in order of heat conductivity of the materials.

3. The backlight module of claim 2, wherein each of the plurality of sub-baseplates is a small wedge, and the baseplate is a large wedge formed by the plurality of sub-baseplates; the thicknesses of the plurality of sub-baseplates are increased linearly, and the sub-baseplate with the highest heat conductivity has the smallest overall thickness.

4. The backlight module of claim 3, wherein the small wedge is a straight wedge, and a contacting surface through which two adjoining sub-baseplates are jointed together includes a plane.

5. The backlight module of claim 3, wherein the small wedge is a curved wedge, and a contacting surface through which two adjoining sub-baseplate are jointed together includes two planes with an included angle $\theta$, $\theta$ is the smaller one of the included angles formed between the two planes, wherein $0° < \theta < 180°$, and an opening of the included angle $\theta$ faces the sub-baseplate with lower heat conductivity.

6. The backlight module of claim 4, wherein in descending order of heat conductivity, cross sectional areas of the plurality of sub-baseplates perpendicular to a thickness direction of the plurality of sub-baseplates are sequentially increased.

7. The backlight module of claim 6, wherein the plurality of sub-baseplates are jointed together by welding.

8. The backlight module of claim 7, further comprising a housing encasing the backplate, wherein a first opening is provided at a side of the housing corresponding to the sub-baseplate with the lowest heat conductivity, and a second opening is provided at a side of the housing corresponding to the sub-baseplate with the highest heat conductivity.

9. The backlight module of claim 8, wherein the light source is provided on the side plate at the side of the sub-baseplate with the highest heat conductivity, and light-emitting surface of the light source faces the baseplate.

10. The backlight module of claim 9, further comprising a diffuser plate provided above the baseplate, wherein the diffuser plate has the same shape as the baseplate, and an upper surface of the diffuser plate is parallel to a lower surface of the baseplate.

11. A display device, comprising the backlight module of claim 1.

* * * * *